(12) United States Patent
Liang

(10) Patent No.: US 9,430,325 B2
(45) Date of Patent: Aug. 30, 2016

(54) METHOD FOR PROGRAMMING DATA, MEMORY STORAGE DEVICE AND MEMORY CONTROL CIRCUIT UNIT

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 30 days.

(21) Appl. No.: 14/302,445

(22) Filed: Jun. 12, 2014

(65) Prior Publication Data

US 2015/0293814 A1    Oct. 15, 2015

(30) Foreign Application Priority Data

Apr. 15, 2014 (TW) ............... 103113696 A

(51) Int. Cl.
*G06F 11/00* (2006.01)
*G06F 11/10* (2006.01)

(52) U.S. Cl.
CPC .................. *G06F 11/1068* (2013.01)

(58) Field of Classification Search
CPC ........................ G06F 11/1068; G06F 11/076
See application file for complete search history.

(56) References Cited

U.S. PATENT DOCUMENTS

| | | | | |
|---|---|---|---|---|
| 2012/0311406 A1* | 12/2012 | Ratnam | ................... | G06F 11/10 714/768 |
| 2012/0324205 A1* | 12/2012 | Teo | ..................... | G06F 12/0246 711/212 |
| 2013/0103894 A1* | 4/2013 | Roohparvar | ........ | G06F 12/0246 711/103 |
| 2013/0124945 A1 | 5/2013 | Hu et al. | | |
| 2013/0326284 A1* | 12/2013 | Losh | .................... | G06F 11/2053 714/47.2 |
| 2014/0047301 A1* | 2/2014 | Kurata | ................ | G06F 11/1008 714/773 |
| 2014/0101490 A1* | 4/2014 | Cronin | ................ | G06F 11/1004 714/42 |
| 2014/0136927 A1* | 5/2014 | Li | ........................ | G06F 11/1048 714/768 |

OTHER PUBLICATIONS

"Office Action of Taiwan Counterpart Application," issued on Feb. 19, 2016, p. 1-p. 9.

\* cited by examiner

*Primary Examiner* — Bryce Bonzo
*Assistant Examiner* — Thien D Nguyen
(74) *Attorney, Agent, or Firm* — Jianq Chyun IP Office

(57) ABSTRACT

A method for programming data, a memory storage device and a memory control circuit unit are provided. The method includes: receiving a writing command which instructs to write data to a logical address belonging to a logical programming unit; if a physical erasing unit of a physical programming unit which the logical programming unit is mapped to is a first type physical erasing unit, programming the data and a parity code corresponding to the data into the physical programming unit according to a first code rate; and if the physical erasing unit is a second type physical erasing unit, programming the data and the parity code corresponding to the data into the physical programming unit according to a second code rate. The first code rate is higher than the second code rate. Therefore, the lifespan of the physical erasing unit having a higher bit error rate may be extended.

21 Claims, 10 Drawing Sheets

METHOD FOR PROGRAMMING DATA, MEMORY STORAGE DEVICE AND MEMORY CONTROL CIRCUIT UNIT

CROSS-REFERENCE TO RELATED APPLICATION

This application claims the priority benefit of Taiwan application serial no. 103113696, filed on Apr. 15, 2014. The entirety of the above-mentioned patent application is hereby incorporated by reference herein and made a part of this specification.

BACKGROUND

1. Technology Field

The present invention is directed to a mechanism for programming data and more particularly, to a method for programming data, a memory storage device and a memory control unit therefor.

2. Description of Related Art

The markets of digital cameras, cellular phones, and MP3 players have expanded rapidly in recent years, resulting in escalated demand for storage media by consumers. Due to having characteristics, such as data non-volatility, low power consumption, compact size and no mechanical structure, the rewritable non-volatile memory module is suitable for being built in the aforementioned portable multi-media devices, for example.

Generally, a lifespan of each physical block in the rewritable non-volatile memory module is related to the erasing count of the physical blocks. After a physical block is repeatedly erased, error bits of data stored in the physical block will be gradually increased. When the number of the error bits of the data is over a number that can be accurately corrected (e.g., when the erasing count of the physical block is over an erasing count threshold), the physical block will not be used any longer in most cases.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a method for programming data, a memory storage device and a memory control circuit unit, in which a physical erasing unit can continue to be used in a manner with higher reliability when a bit error rate (BER) of the physical erasing unit is increased, rather than be discarded directly.

According to an exemplary embodiment of the present invention, a method for programming data is provided. The method is for controlling a rewritable non-volatile memory module. The rewritable non-volatile memory module includes a plurality of physical erasing units, and each of the physical erasing units includes a plurality of physical programming units. The method includes the following steps. A writing command which instructs to write data into at least one of a plurality of logical units is received, where the at least one of the logical units is mapped to a first physical programming unit among the physical programming units, and the first physical programming unit belongs to a first physical erasing unit among the physical erasing units. Whether the first physical erasing unit belongs to a first type physical erasing unit or a second type physical erasing unit is determined. If the first physical erasing unit belongs to the first type physical erasing unit, the data and a parity code corresponding to the data are programmed into the first physical programming unit according to a first code rate. If the first physical erasing unit belongs to the second type physical erasing unit, the data and the parity code corresponding to the data are programmed into the first physical programming unit according to a second code rate. The first code rate is higher than the second code rate.

According to another exemplary embodiment of the present invention, a memory storage device is provided. The memory storage device includes a connection interface unit, a rewritable non-volatile memory module and a memory control circuit unit. The connection interface unit is configured to be coupled to a host system. The rewritable non-volatile memory module includes a plurality of physical erasing units, and each of the physical erasing units comprises a plurality of physical programming units. The memory control circuit unit is coupled with the connection interface unit and the rewritable non-volatile memory module. The memory control circuit unit is configured to receive a writing command which instructs to write data into at least one of a plurality of logical units, where the at least one of the logical units is mapped to a first physical programming unit among the physical programming units, and the first physical programming unit belongs to a first physical erasing unit among the physical erasing units. The memory control circuit unit is further configured to determine whether the first physical erasing unit belongs to a first type physical erasing unit or a second type physical erasing unit. If the first physical erasing unit belongs to the first type physical erasing unit, the memory control circuit unit is further configured to program the data and the parity code corresponding to the data into the first physical programming unit according to a first code rate. If the first physical erasing unit belongs to the second type physical erasing unit, the memory control circuit unit is further configured to program the data and the parity code corresponding to the data into the first physical programming unit according to a second code rate, where the first code rate is higher than the second code rate.

According to yet another embodiment of the present invention, a memory control circuit unit for controlling a rewritable non-volatile memory module is provided. The rewritable non-volatile memory module includes a plurality of physical erasing units, and each of the physical erasing units includes a plurality of physical programming units. The memory control circuit unit includes a host interface, a memory interface, an error checking and correcting (ECC) circuit and a memory management circuit. The host interface is configured to be coupled to a host system. The memory interface is configured to be coupled to the rewritable non-volatile memory module. The memory management circuit is coupled with the host interface, the memory interface and the ECC circuit. The memory management circuit is configured to receive a writing command which instructs to write data into at least one of a plurality of logical units, where the at least one of the logical units is mapped to a first physical programming unit among the physical programming units, and the first physical programming unit belongs to a first physical erasing unit among the physical erasing units. The memory management circuit is further configured to determine whether the first physical erasing unit belongs to a first type physical erasing unit or a second type physical erasing unit. If the first physical erasing unit belongs to the first type physical erasing unit, the memory management circuit is further configured to send a first command sequence which instructs to program the data and the parity code corresponding to the data into the first physical programming unit according to a first code rate. If the first physical erasing unit belongs to the second type physical erasing unit, the memory management circuit is further configured to send a second command sequence which instructs to program the data and the parity code corresponding to the data into the first physical programming unit according to a second code rate, where the first code rate is higher than the second code rate.

To sum up, in the method for programming data, the memory storage device and the memory control circuit unit provided by the present invention, according to whether a physical erasing unit in the rewritable non-volatile memory module is the first type physical erasing unit or the second type physical erasing unit, the data and the parity code corresponding to the data can be adaptively programmed to the physical programming unit belonging to the physical erasing unit according to the first code rate or the second code rate which is higher than the first code rate. In this way, even though the BER of the physical erasing unit is over a predetermined permissible range, the physical erasing unit can continue to be used, rather than be discarded directly.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
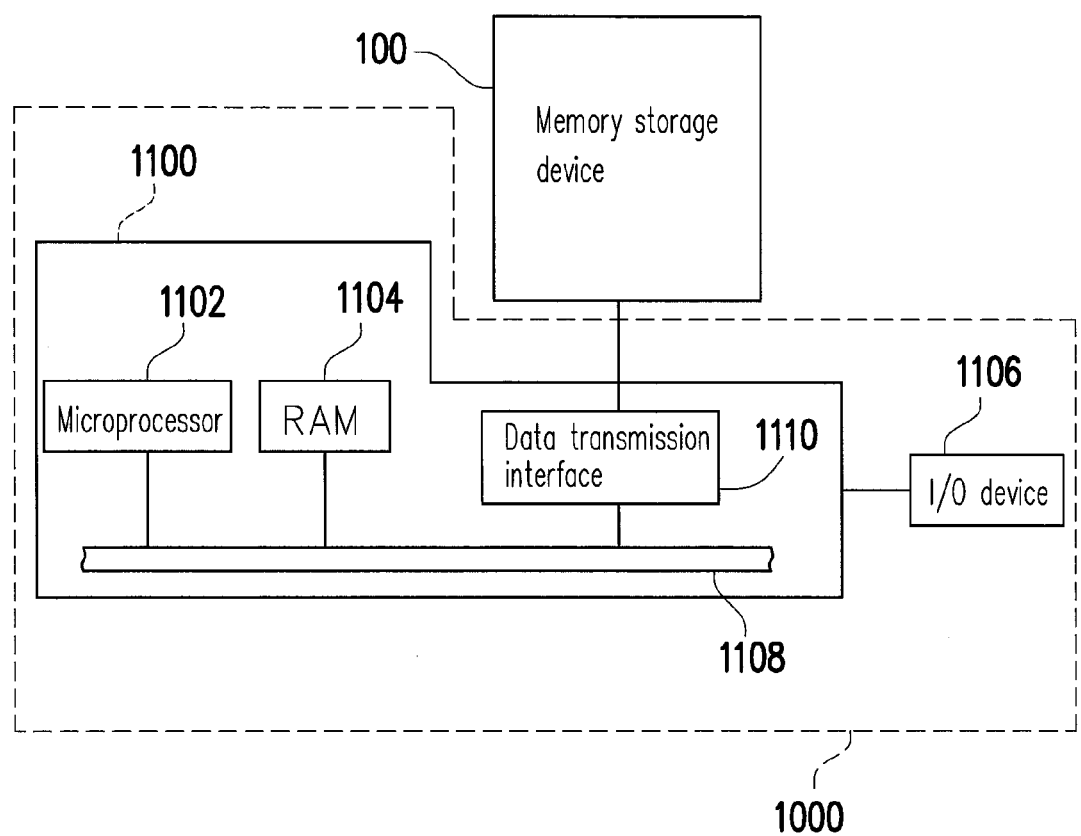
FIG. 1A illustrates a host system and a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a control circuit). The memory storage apparatus is usually used together with a host system, such that the host system can write data into or read data from the memory storage device.

FIG. 1A illustrates a host system and a memory storage device according to an exemplary embodiment of the present invention.

Figure 1B:
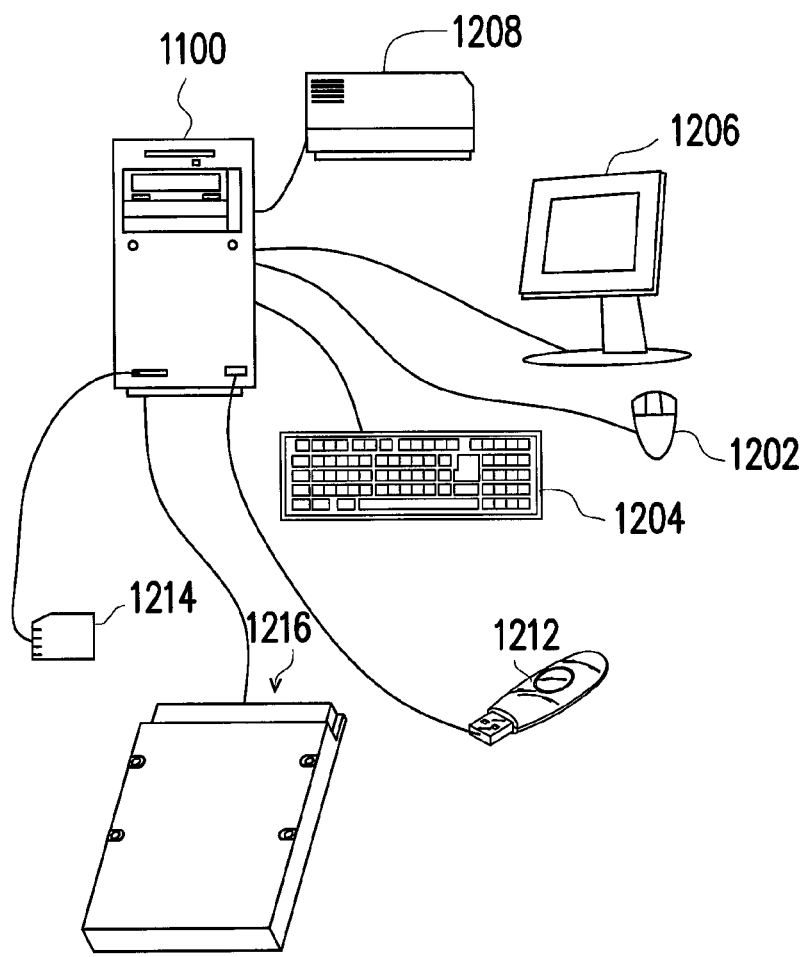
FIG. 1B is a schematic diagram illustrating a computer, an input/output device, and a memory storage device according to an exemplary embodiment of the present invention.

Referring to FIG. 1A, a host system 1000 generally includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

According to an exemplary embodiment of the present invention, the memory storage apparatus 100 is coupled to other elements of the host system 1000 through the data transmission interface 1110. With the operation of the microprocessor 1102, the random access memory (RAM) 1104 and the I/O device 1106, data can be written into or read from the memory storage device 100. For instance, the memory storage device 100 may be a rewritable non-volatile memory storage device, such as a flash drive 1212, a memory card 1214, or a solid state drive (SSD) 1216, as shown in FIG. 1B.

Figure 1C:
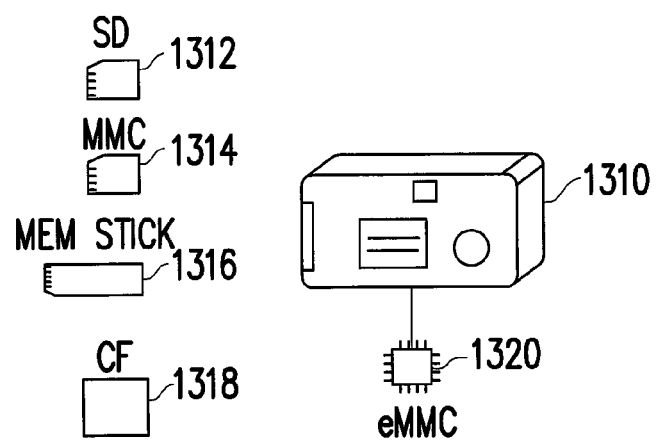
FIG. 1C is a schematic diagram of a host system and a memory storage device according to an exemplary embodiment of the present invention.

Generally speaking, the host system 1000 can substantially be any system collocated with the memory storage device 100 for storing data. Even though the host system 1000 is implemented as a computer system in the present exemplary embodiment, in another exemplary embodiment of the present invention, the host system 1000 may be a digital camera, a video camera, a telecommunication device, an audio player, or a video player. For example, in a scenario that the host system is a digital camera (or a video camera) 1310, the rewritable non-volatile memory storage device is a secure digital (SD) card 1312, a multimedia card (MMC) 1314, a memory stick 1316, a compact flash (CF) card 1318 or an embedded storage device 1320 (as shown in FIG. 1C). The embedded storage device 1320 includes an Embedded MMC (eMMC). It should be mentioned that the eMMC is directly coupled to a substrate of the host system.

Figure 2:
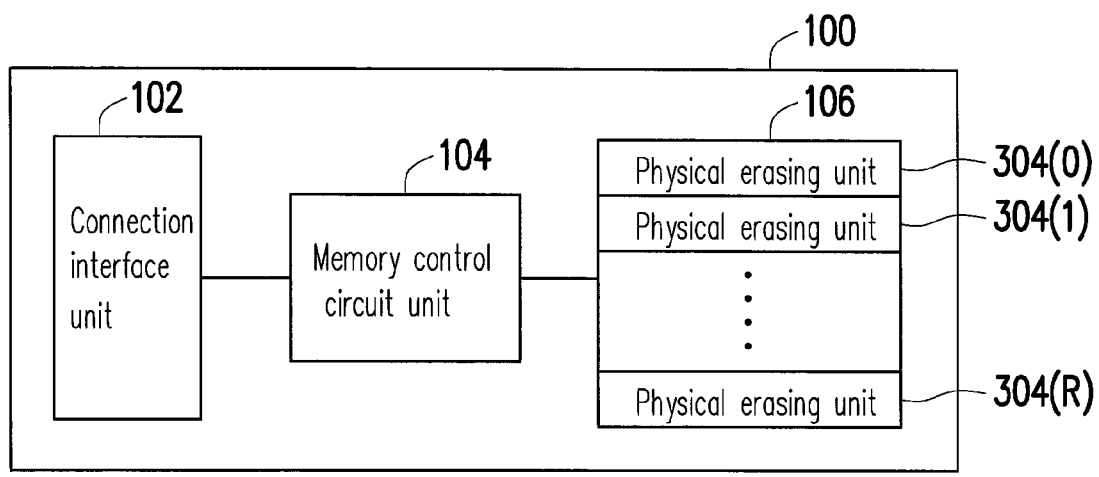
FIG. 2 is a schematic block diagram illustrating the memory storage device shown in FIG. 1A.

FIG. 2 is a schematic block diagram illustrating the memory storage device shown in FIG. 1A.

Referring to FIG. 2, the memory storage device 100 includes a connection interface unit 102, a memory control circuit unit 104, and a rewritable non-volatile memory module 106.

In the present exemplary embodiment, the connection interface unit 102 complies with a serial advanced technology attachment (SATA) standard. However, it should be understood that the present invention is not limited thereto, and the connection interface unit 102 may also comply with the Parallel Advanced Technology Attachment (PATA) standard, the Institute of Electrical and Electronic Engineers (IEEE) 1394 standard, the peripheral component interconnect express (PCI Express) standard, the universal serial bus (USB) standard, the Ultra High Speed-I (UHS-I) interface standard, the Ultra High Speed-II (UHS-II) interface standard, Secure Digital (SD) interface standard, the memory stick (MS) interface standard, the multi media card (MMC) interface standard, the compact flash (CF) interface standard, the integrated device electronics (IDE) standard, or other suitable standards. In the present exemplary embodiment, the connection interface unit may be packaged with the memory control circuit unit in one chip or laid outside a chip having the memory control circuit unit.

The memory control circuit unit 104 is configured to execute a plurality of logic gates or control commands which are implemented in a hardware form or in a firmware form and perform operations such as data writing, reading or erasing in the rewritable non-volatile memory module 106 according to the command of the host system 1000.

The rewritable non-volatile memory module 106 is coupled to the memory control circuit unit 104 and configured to store data written by the host system 1000. The rewritable non-volatile memory module 106 has a plurality of physical erasing units 304(0)-304(R). For instance, the physical erasing units 304(0)-304(R) may belong to the same memory die or different memory dies. Each of the physical erasing units includes a plurality of physical programming units, and the physical programming units belonging to the same physical erasing unit may be written separately but erased at the same time. For instance, each of the physical erasing units is composed of 128 physical programming units. However, it should be understood that the present invention is not limited thereto, and each of the physical erasing units may be composed of 64 or 256 programming units or any other number of physical programming units.

More specifically, each of the physical programming units includes a plurality of word lines and a plurality of bit lines, and a memory cell is disposed at an intersection of each of the word lines and each of the data lines. Each memory cell may store one or more bits. All of the memory cells in the same physical erasing unit are erased together. In the present exemplary embodiment, the physical erasing unit is the smallest unit for data erasing. That is to say, each of the physical erasing units has the least number of memory cells to be erased altogether. For instance, a physical erasing unit is a physical block. On the other hand, the memory cells on the same word line may be grouped into one or more of the physical programming units. If each memory cell is capable of storing two or more bits, the physical programming units on the same word line may be categorized into lower and upper physical programming units. In general, a writing speed of the lower physical programming units is greater than that of the upper physical programming units. In the present exemplary embodiment, each of the physical programming units is the smallest unit for programming. Namely, each of the physical programming units is the smallest unit for writing data. For instance, the physical programming units may be physical pages or physical sectors. In the present exemplary embodiment, the physical programming units are physical pages, and each of the physical programming units includes a data bit area and a redundant bit area. The data bit area includes a plurality of physical sectors for storing data of users, and the redundant bit area is configured for storing system data (e.g., parity codes). In the present exemplary embodiment, each data bit area contains 32 physical sectors, and a size of each physical sector is 512 bytes (512 B). However, in other exemplary embodiments, the data bit region may contain 8, 16, or a greater or a smaller number of physical sectors, and the number and the size of the physical sectors are not limited in the present invention.

In the present exemplary embodiment, the rewritable non-volatile memory module 106 may be a multi level cell (MLC) NAND flash memory module (i.e., a flash memory module capable of storing data of at least 2 bits in one memory cell). However, the present invention is not limited thereto, and the rewritable non-volatile memory module 106 may also be a single-level cell (SLC) NAND flash memory module, a tri-nary-level cell (TLC) NAND flash memory module, any other flash memory module, or any other memory module with the same characteristics.

Figure 3:
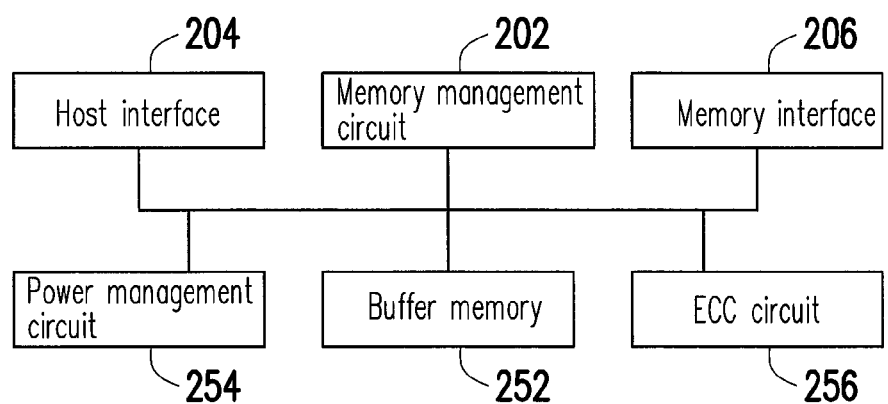
FIG. 3 is a schematic block diagram illustrating a memory control circuit unit according to an exemplary embodiment of the present invention.

FIG. 3 is a schematic block diagram of a memory control circuit unit according to an exemplary embodiment of the present invention.

Referring to FIG. 3, the memory control circuit unit 104 includes a memory management circuit 202, a host interface 204 and a memory interface 206.

The memory management circuit 202 is configured to control the overall operation of the memory control circuit unit 104. Specifically, the memory management circuit 202 has a plurality of control commands, and when the memory storage device 100 is operated, the control commands are executed to perform various data operations, such as data writing, data reading and data erasing. Operations of the memory management circuit 202 are equivalent to the operations of the memory control circuit unit 104, thus related description is omitted hereinafter.

In the present exemplary embodiment, the control commands of the memory management circuit 202 are implemented in a firmware form. For instance, the memory management circuit 202 has a microprocessor (not shown) and a read-only memory (not shown), and the control commands are burnt into the read-only memory. When the memory storage device 100 is operated, the control commands are executed by the microprocessor to perform various data operations, such as data writing, data reading or data erasing.

In another exemplary embodiment of the present invention, the control commands of the memory management circuit 202 may also be stored in a specific area (e.g., a system area in the memory module exclusively used for storing system data) of the rewritable non-volatile memory module 106 as program codes. Moreover, the memory management circuit 202 has a microprocessor unit (not shown), a read-only memory (not shown), and a random access memory (not shown). Specifically, the read-only memory has a boot code. When the memory control circuit unit 104 is enabled, the microprocessor unit first executes the boot code for loading the control commands stored in the rewritable non-volatile memory module 106 into the random access memory of the memory management circuit 202. Afterwards, the microprocessor unit runs the control commands for various data operations such as data writing, data reading and data erasing.

Additionally, in another exemplary embodiment of the present invention, the control commands of the memory management circuit 202 may also be implemented in a hardware form. For example, the memory management circuit 202 includes a microcontroller, a memory management unit, a memory writing unit, a memory reading unit, a memory erasing unit and a data processing unit. The memory management unit, the memory writing unit, the memory reading unit, the memory erasing unit and the data processing unit are coupled to the microcontroller. The memory management unit is configured for managing the physical erasing units of the rewritable non-volatile memory module 106, the memory writing unit is configured for issuing a writing command to the rewritable non-volatile memory module 106 in order to write data into the rewritable non-volatile memory module, the memory reading unit is configured for issuing a reading command to the rewritable non-volatile memory module 106 in order to read data from the rewritable non-volatile memory module 106, the memory erasing unit is configured for issuing an erasing command to the rewritable non-volatile memory module 106 in order to erase data from the rewritable non-volatile memory module 106, the data processing unit is configured for processing both the data to be written into and the data to be read from the rewritable non-volatile memory module 106.

The host interface 204 is coupled to the memory management circuit 202 and configured for receiving and identifying commands and data transmitted from the host system 1000. Namely, the commands and data sent by the host system 1000 are transmitted to the memory management circuit 202 through the host interface 204. In the present exemplary embodiment, the host interface 204 complies with the SATA standard. However, it should be understood that the present invention is not limited thereto, and the host interface 204 may also comply with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 206 is coupled to the memory management circuit 202 for accessing the rewritable non-volatile memory module 106. In other words, the data to be written into the rewritable non-volatile memory module 106 is converted to a format acceptable for the rewritable non-volatile memory module 106 by the memory interface 206.

In an exemplary embodiment, the memory control circuit unit 104 further includes a buffer memory 252, a power management circuit 254, and an error checking and correcting (ECC) circuit 256.

The buffer memory 252 is coupled to the memory management circuit 202 and configured for temporarily storing data and commands from the host system 1000 or data from the rewritable non-volatile memory module 106.

The power management circuit 254 is coupled to the memory management circuit 202 and configured for controlling the power of the of the memory storage apparatus 100.

The ECC circuit 256 is coupled to the memory management circuit 202 and configured for executing an error checking and correcting procedure to ensure the accuracy of data. To be specific, when the memory management circuit 202 receives a write command from the host system 1000, the ECC circuit 256 generates a corresponding parity code for the data corresponding to the write command, and the memory management circuit 202 writes the data corresponding to the write command and the corresponding parity code into the rewritable non-volatile memory module 106. For instance, the parity code includes at least one of an error correcting (ECC) code and an error detecting (EDC) code. Moreover, the parity code may also include codes for verifying the accuracy of the data, which is not limited in the present invention. Subsequently, when reading the data from the rewritable non-volatile memory module 106, the memory management circuit 202 also reads the parity code corresponding to the data simultaneously, and the ECC circuit 256 executes the error correcting procedure for the read data based on the parity code.

Figure 4:
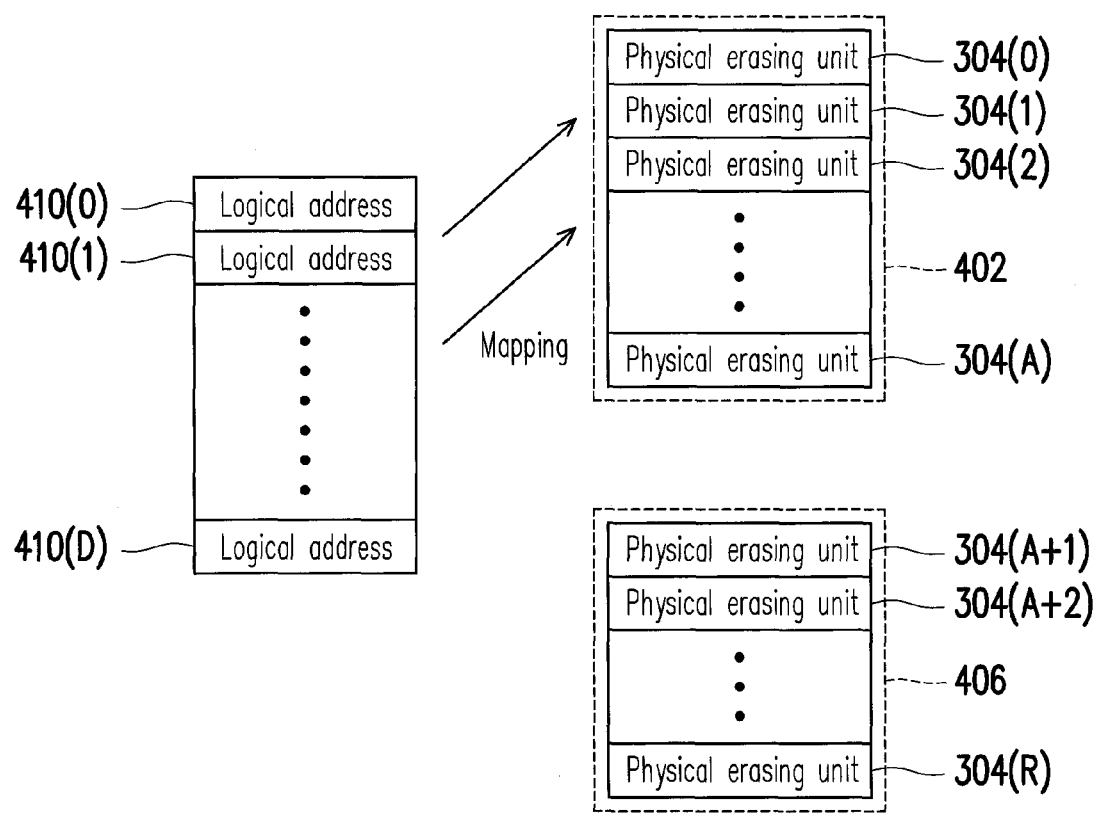
FIG. 4 is an exemplary schematic diagram illustrating managing a rewritable non-volatile memory module according to an exemplary embodiment.

FIG. 4 is an exemplary schematic diagram illustrating managing a rewritable non-volatile memory module according to an exemplary embodiment.

It should be understood that terms, such as "select", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical erasing units of the rewritable non-volatile memory module are not changed.

Referring to FIG. 4, the memory management circuit 202 may logically divide the physical erasing units 304(0)-304(N) into a plurality of areas, such as a storage area 402 and a system area 406.

The physical erasing units belonging to the storage area 402 are configured to store data from the host system 1000. The storage area 402 may store valid data and invalid data. For instance, when the host system is about to delete valid data, the deleted data may still be stored in the storage area 402, but marked as invalid data. A physical erasing unit that does not store any valid data is also referred to as a spare physical erasing unit. A physical programming unit that does not store any valid data is also referred to as a spare physical programming unit. For instance, a physical erasing unit being erased becomes a spare physical erasing unit. If a physical erasing unit of the storage area 402 or the system area 406 is damaged, a physical erasing unit belonging to the storage area 402 may be used to replace the damaged physical erasing unit. If there is no more available physical erasing unit in the storage area 402 for replacing the damaged physical erasing unit, the memory storage device 100 is announced as being in a write-protected state and data cannot be written therein.

The physical erasing units belonging to the system area 406 are configured to record the system data, which includes information related to the manufacturer and a model, a number of the physical erasing units and a number of physical programming units in each physical erasing unit and so forth.

The numbers of physical erasing units in the storage area 402 and the system area 406 vary with different memory standards. Additionally, it should be understood that the grouping relations of associating the physical erasing units to the storage area 402 and the system area 406 are dynamically changed during the operations of the memory storage device 100. For example, when a physical erasing unit in the system area 406 is damaged and replaced by a physical erasing unit in the storage area 402, the physical erasing unit which is previously in the storage area 402 is associated to the system area 406.

The memory management circuit 202 configures logical addresses 410(0)-410(D) to be mapped to a portion of the physical erasing units 304(0)-304(A) in the storage area 402. The host system 1000 access data stored in the storage area 402 through the logic addresses 410(0)-410(D). In the present exemplary embodiment, a logic address is mapped to a physical sector, a plurality of logical addresses forms a logical programming unit, and a plurality of logical programming units forms a logical erasing unit. A logical programming unit may be mapped to one or more physical programming units, and a logical erasing unit may be mapped to one or more physical erasing units.

The memory management circuit 202 receives a writing command from the host system 1000. The writing command instructs to write data into one or more logical units. In the present exemplary embodiment, a logical unit refers to a logical address (i.e., a first logic address) among the logic addresses 410(0)-410(D). The first logical address belongs to one or more first logical programming units, and the one or more first logical programming unit are mapped to one or more first physical programming units in the storage area 402. However, in another exemplary embodiment, a logical unit may also refer to a logical programming unit (e.g., a first logical programming unit). Before programming data into the first physical programming unit, the memory management circuit 202 determines whether a physical erasing unit (i.e., a first physical erasing unit) to which the first physical programming unit belongs is belonging to a first type physical erasing unit or a second type physical erasing unit. A bit error rate (BER) (i.e., a first BER) of the first type physical erasing unit is lower than a BER (i.e., a second BER) of the second type physical erasing unit. A BER of a physical erasing unit indicates, after data stored in the physical erasing unit is read, a rate taken by error bits in the read data. In an exemplary embodiment, the second type physical programming unit may also be referred to as a high-BER physical programming unit.

In an exemplary embodiment, the memory management circuit 202 determines whether a BER assessing value of the first physical erasing unit meets a threshold condition. If the BER assessing value of the first physical erasing unit does not meet the threshold condition, the memory management circuit 202 determines that the first physical erasing unit belongs to the first type physical erasing unit. If the BER assessing value of the first physical erasing unit meets the threshold condition, the memory management circuit 202 determines that the first physical erasing unit belongs to the second type physical erasing unit. For instance, in an exemplary embodiment, a BER assessing value of a physical erasing unit has two states, which are "0" and "1", respectively. Only when the BER assessing value of a physical erasing unit is "1", the memory management circuit 202 determines that the BER assessing value of the physical erasing unit meets the threshold condition.

Additionally, in another exemplary embodiment, a BER assessing value of a physical erasing unit may have more than two states, and each of the states is related to the BER of the physical erasing units. In an exemplary embodiment, the BER assessing value may be any one value among 0-100. A higher BER assessing value of a physical erasing unit indicates a higher BER of the physical erasing unit. A lower BER assessing value of a physical erasing unit indicates a lower BER of the physical erasing unit. Only when the BER assessing value of the physical erasing unit reaches a threshold value (e.g., 70), the memory management circuit 202 determines that the BER assessing value of the physical erasing unit meets the threshold condition. Besides, the BER assessing value may be presented in any form, and is not limited to the above descriptions.

Generally speaking, the BER of a physical erasing unit is in positive correlation with an erasing count, a writing count and a reading count. The erasing count, the writing count and the reading count are respectively numbers of times that a physical erasing unit is erased, written and read. Once one of the erasing count, the writing count and the reading count of the physical erasing unit get higher, error bits contained in data stored in the physical erasing unit may be more when the data is read. Therein, the erasing count causes the greatest affection to the BER of each physical erasing unit. Additionally, in some circumstances, the BER of each physical erasing unit may also be related to a data storage time and/or a temperature of each physical erasing unit. A data storage time of a physical erasing unit indicates a duration that data is stored in the physical erasing unit, which may be the maximum value or an average value of the duration that each data is stored in the physical erasing unit and is not limited in the present invention. Additionally, each physical erasing unit in the rewritable non-volatile memory module 106 may have the same temperature or different temperatures, but the temperature of each physical erasing unit may be slightly different from each other.

If one of an erasing count, a writing count and a reading count of a physical erasing unit is over a predetermined number, a data storage time of the physical erasing unit is over a predetermined time duration and/or a temperature of the physical erasing unit is over a predetermined temperature range, a number of error bits and/or a BER of data stored in the physical erasing unit will dramatically increased when the data is read, which may have a great probability to exceed the maximum amount of error bits that can be detected and/or corrected by the ECC circuit 256. Therefore, in an exemplary embodiment, the memory management circuit 202 may determine a BER assessing value of a physical erasing unit according to at least one or a combination of at least two of erasing count information, writing count information, reading count information, error bit number information, BER information, data storage time information and temperature information of the physical erasing unit. For instance, in an exemplary embodiment, the memory management circuit 202 determines whether an erasing count of the first physical erasing unit is higher than a predetermined number. The predetermined number may be, for example, preset by the manufacturer or defined by a user. For example, the predetermined number may be 3000 times, or less or more than 3000 times. If the erasing count of the first physical erasing unit is higher than the predetermined number, the memory management circuit 202 sets a BER assessing value of the first physical erasing unit as "1" or any corresponding value. Otherwise, if the erasing count of the first physical erasing unit is not higher than the predetermined number, the memory management circuit 202 sets the BER assessing value of the first physical erasing unit as "0" or any corresponding value.

In other words, for a new rewritable non-volatile memory module, all physical erasing units in the rewritable non-volatile memory module may belong to the first type physical erasing units. However, as the rewritable non-volatile memory module is used for longer, more and more physical erasing units in the rewritable non-volatile memory module may become the second type physical erasing units due to increased times for performing data erasing, data writing and/or data reading operations. Alternatively, a portion of the first type physical erasing units may be transformed to the second type physical erasing units based on increased data storage time and temperature changes. In other words, all factors that may cause affection to BER of each physical erasing unit may serve for determining whether a physical erasing unit belongs to a first type physical erasing unit or a second type physical erasing unit.

The memory management circuit 202 may record the physical erasing unit that are determined as the second physical erasing units in a table. When being intended to write data into the first physical programming unit belonging to the first physical erasing unit, the memory management circuit 202 may look up in the table to determine whether the first physical erasing unit belongs to the first type physical erasing unit or the second type physical erasing unit. Additionally, the memory management circuit 202 may also associate the physical erasing units that are determined as the second type physical erasing units to a high-BER zone or a high-BER group in the storage area, which is not limited in the present invention.

According to the first physical erasing unit belonging to the first type physical erasing unit or the second type physical erasing unit, the memory management circuit 202 may selectively program the data and the parity code corresponding to the data into the first physical programming unit according to a first code rate or a second code rate. The first code rate is higher than the second code rate. For instance, if the first physical erasing unit belongs to the first type physical erasing unit, the memory management circuit 202 programs the data and the parity code corresponding to the data into the first physical programming unit according to the first code rate. If the first physical erasing unit belongs to the second type physical erasing unit, the memory management circuit 202 programs the data and the parity code corresponding to the data into the first physical programming unit according to the second code rate. In an exemplary embodiment, a programming operation may be considered as a writing operation. That is, programming data to a physical programming unit is equivalent to writing the data into the physical programming unit.

In detail, the memory management circuit 202 divides the data to be written into one or more data segments and controls the ECC circuit 256 to generate one or more parity code segments, where each parity code segment corresponds to a data segment. In this case, a data segment is a unit for generating a parity code segment, and a parity code serves to verify and/or correct the corresponding data segment. For instance, if it is assumed that k is a data length of a data segment, and n-k is a data length of a parity code segment corresponding to the data segment, a ratio of k to n (i.e., k/n) may be a code rate. Specially, if a data length of the data to be written is consistent with a data length of a data segment, the data itself is a data segment, and a parity code corresponding to the data is a parity code segment corresponding to the data segment. If the data length of the data to be written is consistent with a sum of a plurality of data lengths of a plurality of data segments, the data may be divided into a plurality of data segments, and the parity code corresponding to the data may include a plurality of parity code segments corresponding to the data segments.

In the present exemplary embodiment, when the first physical erasing unit belongs to the first type physical erasing unit, the memory management circuit 202 may write the data to be written and the parity code corresponding thereto into the first physical programming unit according to a predetermined data length of a data segment and a predetermined data length of a parity code segment corresponding to the data segment (e.g., a first code rate).

Figure 5:
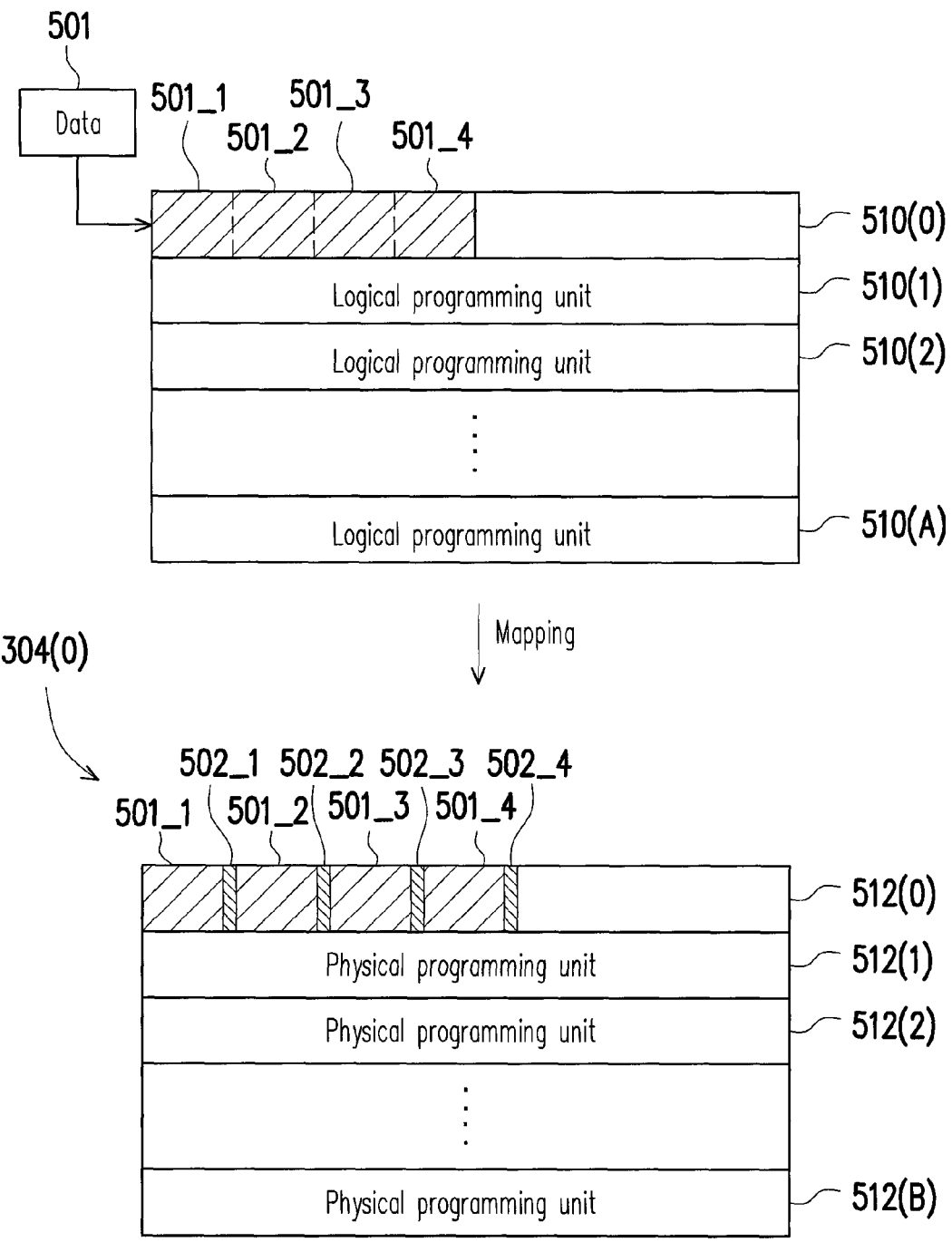
FIG. 5 is an exemplary schematic diagram illustrating programming the data and the parity code corresponding to the data into the physical programming unit according to a first code rate according to an exemplary embodiment of the present invention.

FIG. 5 is an exemplary schematic diagram illustrating programming the data and the parity code corresponding to the data into the physical programming unit according to a first code rate according to an exemplary embodiment of the present invention.

With reference to FIG. 5, if it is assumed that the writing command from the host system 1000 instructs to write data 501 into the logic address 410(0). For example, a data length of the data 501 is 4 KB (i.e., 4096 bytes). In case that the logical address 410(0) belongs to a logical programming unit 510(0), the memory management circuit 202 writes the data 501 into the logical programming unit 510(0). The logical programming unit 510(0) is mapped to the physical programming unit 512(0). If the physical erasing unit 304(0) to which the physical programming unit 512(0) belongs is belonging to the first type physical erasing unit, the memory management circuit 202 divides the data 501 into data segments 501_1 to 501_4 based on a data length of the data 501, e.g., a data length of each of the data segments 501_1 to 501_4 is 1 KB. The ECC circuit 256 generates parity code segments 502_1 to 502_4 corresponding to the data segments 501_1 to 501_4. For example, a data length of each of the data segments 502 is 70 B (i.e., 70 bytes). Namely, when a data segment having a data length of 1 KB is read, the data segment may be verified and/or corrected according to a parity code having a data length of 70 B. The memory management circuit 202 writes the data segments 501_1 to 5014 and the parity code segments 502_1 to 502_4 into the physical programming unit 512(0) according to a predetermined rule. For instance, in the present exemplary embodiment, a range of a physical address for storing each parity code segment is followed by a range of a physical address for storing each data segment corresponding to the parity code segment (as shown in FIG. 5). However, in another exemplary embodiment, all the data segments and parity code segments may be stored separately. For instance, all the data segments are stored in a range of the physical addresses for storing user data, and all the parity code segments are stored in a range of the physical addresses for storing redundant data.

On the other hand, in the present exemplary embodiment, when the first physical erasing unit belongs to the second type physical erasing unit, the memory management circuit 202 increases the data length of the parity code segment corresponding to each data segment, so as to write the data to be written and the parity code corresponding thereto into the first physical programming unit according to a predetermined data length of a data segment and a longer data length of a parity code segment (e.g., a second code rate).

Figure 6:
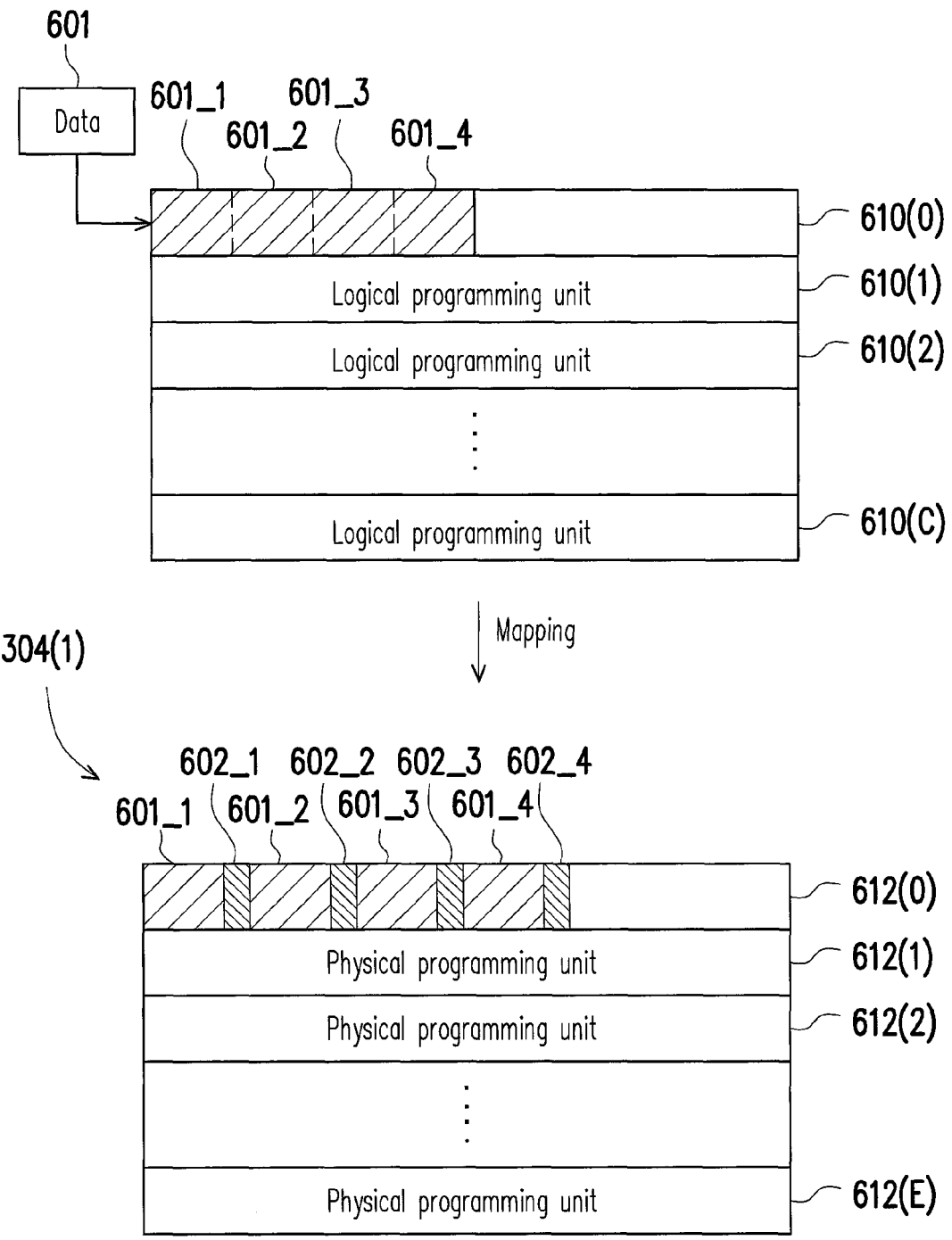
FIG. 6 is an exemplary schematic diagram illustrating programming the data and the parity code corresponding to the data into the physical programming unit according to a second code rate according to an exemplary embodiment of the present invention.

FIG. 6 is an exemplary schematic diagram illustrating programming the data and the parity code corresponding to the data into the physical programming unit according to a second code rate according to an exemplary embodiment of the present invention.

With reference to FIG. 6, if it is assumed that the writing command from the host system 1000 instructs to write data 601 into the logic address 410(1). For example, a data length of the data 601 is 4 KB. In case that the logical address 410(1) belongs to a logical programming unit 610(0), the memory management circuit 202 writes the data 601 into the logical programming unit 610(0). The logical programming unit 610(0) is mapped to a physical programming unit 612(0). If the physical erasing unit 304(1) to which the physical programming unit 612(0) belongs is belonging to the second type physical erasing unit, the memory management circuit 202 divides the data 601 into data segments 601_1 to 601_4 based on a data length of the data 601, e.g., a data length of each of the data segments 601_1 to 601_4 is 1 KB. The ECC circuit 256 generates parity code segments 602_1 to 602_4 corresponding to the data segments 601_1 to 601_4. For instance, a data length of each of the data segments 602_1 to 602_4 is 140 B. Namely, in the present exemplary embodiment, the data length of each parity code segment is twice the data length of each parity code segment of the embodiment illustrated in FIG. 5, but the present invention is not limited thereto. For example, the multiple may be triple, 4 times or more. The memory management circuit 202 writes the data segments 601_1 to 601_4 and the parity code segments 602_1 to 602_4 to the physical programming unit 612(0) according to the predetermined rule. Namely, when a data segment having a data length of 1 KB is read, the data segment may be verified and/or corrected according to a parity code having a data length of 140 KB. Thereby, even though the physical erasing unit for storing the data belongs to the second type physical erasing unit, more error bits in the read data may be found and/or corrected. For instance, in the exemplary embodiment illustrated in FIG. 5, 40 bits of the error bits can be found in the data segment having the data length of 1 KB, while in the present exemplary embodiment, 80 bits of the error bits can be found in the data segment having the data length of 1 KB.

However, in another exemplary embodiment, if the first physical erasing unit belongs to the second type physical erasing unit, the memory management circuit 202 does not change the data length of each parity code segment, but reduces the data length of each data segment, so as to write the data to be written and the parity code corresponding thereto into the first physical programming unit according to a shorter data length of a data segment and a predetermined data length of a parity code segment (e.g., the second code rate).

Figure 7:
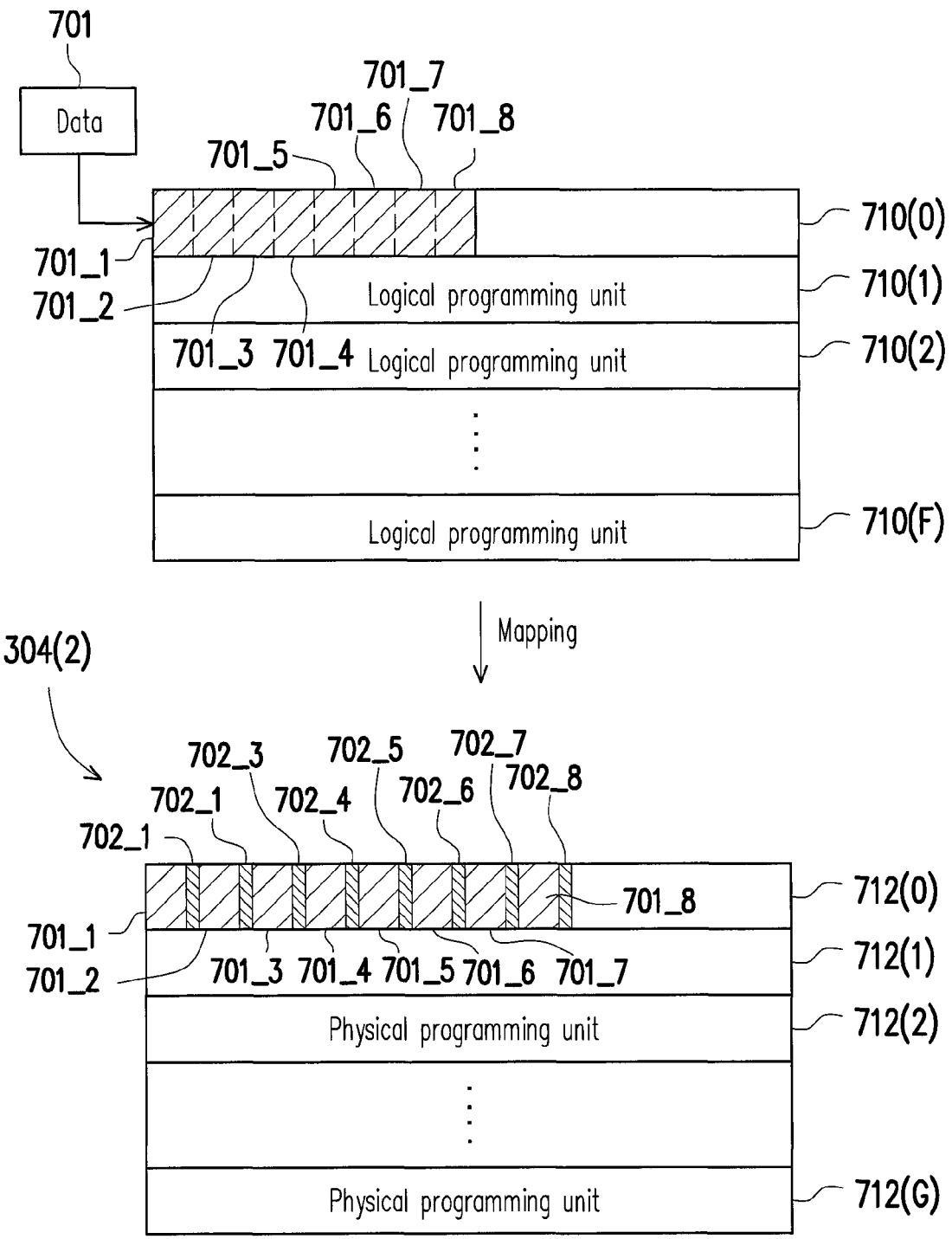
FIG. 7 is an exemplary schematic diagram illustrating programming the data and the parity code corresponding to the data into the physical programming unit according to the second code rate according to another exemplary embodiment of the present invention.

FIG. 7 is an exemplary schematic diagram illustrating programming the data and the parity code corresponding to the data into the physical programming unit according to the second code rate according to another exemplary embodiment of the present invention.

With reference to FIG. 7, if it is assumed that the writing command from the host system 1000 instructs to write data 701 into the logic address 410(2). For example, a data length of the data 701 is 4 KB. In case that the logical address 410(2) belongs to a logical programming unit 710(0), the memory management circuit 202 writes the data 701 into the logical programming unit 710(0). The logical programming unit 710 (0) is mapped to a physical programming unit 712(0). If the physical erasing unit 304(2) to which the physical programming unit 712(0) belongs is belonging to the second type physical erasing unit, the memory management circuit 202 divides the data 701 into data segments 701_1 to 701_8 based on a data length of the data 701, e.g., a data length of each of the data segments 701_1 to 701_8 is 512 B. Namely, in the present exemplary embodiment, the data length of each data segment is ½ the data length of each data segment of the embodiment illustrated in FIG. 5, but the present invention is not limited thereto. For example, the multiple may be ⅓, ¼ or less. The ECC circuit 256 generates parity code segments 702_1 to 702_8 corresponding to the data segments 701_1 to 701_8. For instance, a data length of each of the parity code segments 702_1 to 702_8 is 70 B. The memory management circuit 202 writes the data segments 701_1 to 701_8 and the parity code segments 702_1 to 702_8 into the physical programming unit 712(0) according to the predetermined rule. Namely, when a data segment having a data length of 512 B is read, the data segment may be verified and/or corrected according to a parity code having a data length of 70 B. Thereby, even though the physical erasing unit for storing the data belongs to the second type physical erasing unit, more error bits in the read data may be found and/or corrected. For instance, in the exemplary embodiment illustrated in FIG. 5, 40 bits of the error bits can be found in the data segment having the data length of 1 KB, while in the present exemplary embodiment, 40 bits of the error bits can be found in the data segment having the data length of 512 B. Likewise, in two data segments having a sum of data lengths of 1 KB, 80 bits of error bits can be found.

It is to be mentioned that according to the definition of a rate code (i.e., k/n), the first code rate of the exemplary embodiment illustrated in FIG. 5 may be expressed by 1024/(1024+70), the second code rate of the exemplary embodiment illustrated in FIG. 6 may be expressed by 1024/(1024+140), and the second code rate of the exemplary embodiment illustrated in FIG. 7 may be expressed by 512/(512+70). In other words, when a BER of a physical erasing unit is increased up to a degree that cannot be checked by using the predetermined error detecting mechanism, by means of writing the data to be written into the physical erasing unit according to a lower code rate, the physical erasing unit may continue to be used, without being considered as an unusable or damaged physical erasing unit.

It is to be mentioned that in the exemplary embodiment illustrated in FIG. 5, only one physical programming unit can completely store data having a data length that is not over a capacity size of a logical programming unit and a parity code corresponding to the data. For instance, if a capacity size of the physical programming unit 512(0) is 8 KB, the data 501 and the parity code corresponding to the data 501 may be completely written into the physical programming unit 512 (0) as long as the data length of the data 501 is not over 8 KB. In another exemplary embodiment where the data and the parity code corresponding thereto is written according to the second code rate, if the capacity size of the physical programming unit 512(0) is 16 KB, the data 501 and the parity code corresponding to the data 501 may be completely written into the physical programming unit 512(0) as long as the data length of the data 501 is not over 16 KB. Moreover, the capacity size of the physical programming unit may be 32 KB or more, which is not limited in the present invention. However, in the exemplary embodiments illustrated in FIG. 6 to FIG. 7, the data length of the data to be written is unchanged, but the data length of the parity code corresponding to the data is longer. Thus, in certain cases, even though the data length of the data to be written is not over a capacity size of a logical programming unit, a sum of the data length of the data and the data length of the parity code corresponding to the data may be probably over the capacity size of the physical programming unit. In such circumstance, the memory management circuit 202 may use two or more physical programming units to store the data and the parity code corresponding to the data. Namely, a portion (also referred to as a first portion) of the data to be written is written into the first physical programming unit, and the other portion (also referred to as a second portion) of the data to be written is written into a second physical programming unit. For instance, if a capacity size of the first physical programming unit is 8 KB, in an exemplary embodiment, the first physical programming unit may be used to store at most data having a data length of 7 KB and a parity code corresponding thereto having a data length of 980 B (i.e., 7×140 B or 14×70 B). If a data length of the data to be written is 8 KB, a first portion of the data which has a data length of 7 KB is written into the first physical programming unit, and a second portion of the data which has a data length of 1 KB is written into the second physical programming unit. For instance, the second physical programming unit may belong to the first physical erasing unit, any physical erasing unit in the storage area 402 which also belongs to the second type physical erasing unit or any physical erasing unit, which is not limited in the present invention.

In an exemplary embodiment, the memory management circuit 202 serves a specific data length as a basic management unit, and writes data into the rewritable non-volatile memory module 106 based on the basic management unit. For instance, a data length of one basic management unit is 4 KB, but the present invention is not limited thereto. A capacity size of one physical programming unit may match a data length of one or more basic management units. For instance, if a capacity size of a physical programming unit is 8 KB, the capacity size of the physical programming unit may be consistent with a data length of two basic management units. If the capacity size of the physical programming unit is 16 KB, the capacity size of the physical programming unit may be consistent with a data length of four basic management units, and so on. Taking a physical programming unit having a capacity size of 8 KB as an example, if a data length of data to be written into the physical programming unit is not over a data length of one basic management unit, the memory management circuit 202 writes the data into the physical programming unit by using one basic management unit, and if the data length of the data to be written is over a data length of one basic management unit, but not over a data length of two basic management units, the memory management circuit 202 writes the data into the physical programming unit by using two basic management units.

In the present exemplary embodiment, if it is assumed that a capacity size of one physical programming unit is consistent with a data length of N+1 basic management units, where N is a positive integer (for example, N may be, but not limited to, 1, 3 or 5). If the first physical erasing unit belongs to the second type physical erasing unit, the memory management circuit 202 determines whether the data length of the data to be written is over a data length of N basic management units, where N is determined based on the capacity size of the first physical programming unit. For instance, if the capacity size of the physical programming unit is 8 KB, it indicates that the capacity size of the physical programming unit is consistent with a data length of two basic management units, and thus, N is 1. If the capacity size of the physical programming unit is 16 KB, it indicates that the capacity size of the physical programming unit is consistent with a data length of four basic management units, and thus, N is 3, and so on. If the first physical erasing unit belongs to the second type physical erasing unit, and the data length of the data to be written is not over a data length of N basic management units, the memory management circuit 202 may only write the data and the parity code corresponding to the data into the first physical programming unit according to the second code rate. Otherwise, if the first physical erasing unit belongs to the second type physical erasing unit, and the data length of the data to be written is over the data length of N basic management units, the memory management circuit 202 may write a first portion of the data and a first portion of the parity code corresponding to the data into the first physical programming unit according to the second code rate and write a second portion of the data and a second portion of the parity code corresponding to the data into the second physical programming unit according to the second code rate. For instance, the second physical programming unit may belong to the first physical erasing unit, any physical erasing unit in the storage area 402 which also belongs to the second type physical erasing unit or any physical erasing unit, which is not limited in the present invention.

Figure 8:
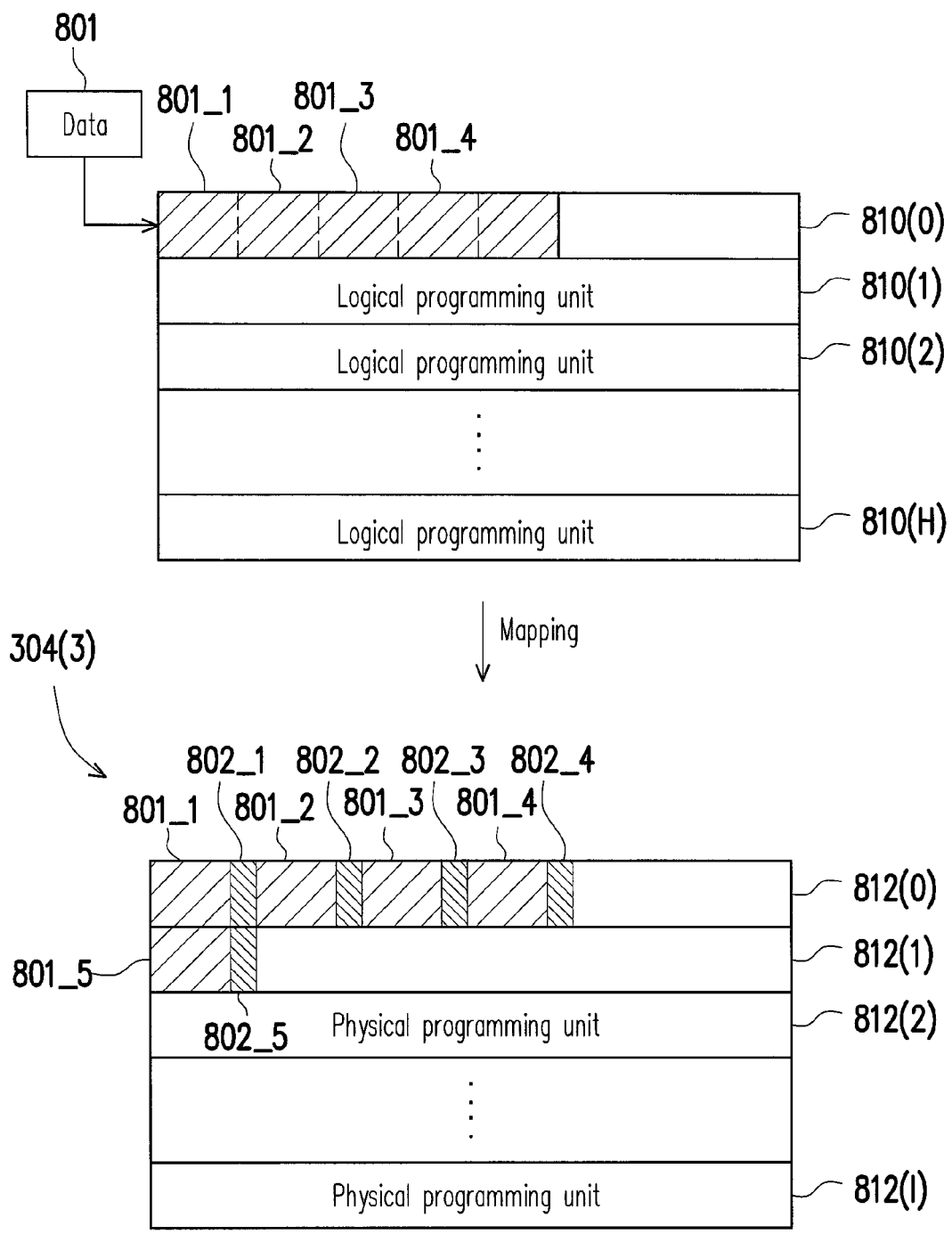
FIG. 8 is an exemplary schematic diagram illustrating programming the data and the parity code corresponding to the data into the physical programming unit according to the second code rate according to another exemplary embodiment of the present invention.

FIG. 8 is an exemplary schematic diagram illustrating programming the data and the parity code corresponding to the data into the physical programming unit according to the second code rate according to another exemplary embodiment of the present invention.

With reference to FIG. 8, if it is assumed that the writing command from the host system 1000 instructs to write data 801 into the logic address 410(3). For example, a data length of the data 801 is 5 KB. In case that the logical address 410(3) belongs to a logical programming unit 810(0), the memory management circuit 202 writes the data 801 into the logical programming unit 810(0). The logical programming unit 810(0) is mapped to a physical programming unit 812(0). If the physical erasing unit 304(3) to which the physical programming unit 812(0) belongs is belonging to the second type physical erasing unit, the memory management circuit 202 divides the data 801 into data segments 801_1 to 801_5 based on a data length of the data 801, e.g., a data length of each of the data segments 801_1 to 801_5 is 1 KB. The ECC circuit 256 generates parity code segments 802_1 to 802_5 corresponding to the data segments 801_1 to 801_5. For instance, a data length of each of the parity code segments 802_1 to 802_5 is 140 B. In addition, the data 801 may be divided into more data segments (e.g., 10 data segments each of which has a data length of 512 B) in the manner of the exemplary embodiment illustrated in FIG. 7, and a data length of each parity code segment may be set as a predetermined data length (e.g., 70 B) of a parity code segment, which is not limited in the present invention. The memory management circuit 202 determines whether the data length of the data 801 is over the data length of N basic management units. In this case, it is assumed that a capacity size of the physical programming unit 812(0) is 8 KB, and thus, N is 1. The memory management circuit 202 determines whether the data length (e.g., 5 KB) of the data 801 is over the data length (e.g., 4 KB) of one basic management unit. If the data length of the data 801 is over the data length of one basic management unit, The memory management circuit 202 writes the data segments 801_1 to 801_4 and the parity code segments 802_1 to 802_4 corresponding thereto to the physical programming unit 812(0) and writes the data segments 801_5 and the parity code segments 802_5 corresponding thereto to a physical programming unit 812(1). In this case, the data length of the data segments 801_1 to 801_4 is consistent with the data length of one basic management unit. In the present exemplary embodiment, the second physical programming unit is described as the physical programming unit 812(1) belonging to the physical erasing unit 304(3), however, in another exemplary embodiment, the second physical programming unit may also belong to any physical erasing unit in the storage area 402 which also belongs to the second type physical erasing unit or any physical erasing unit. That is, after the data 801 is written into the physical programming units 812(0) and 812(1), the logical programming unit 810(0) is mapped to the physical programming units 812(0) and 812(1). Additionally, if the capacity size of the physical programming unit 812(0) is 16 KB or more, N is only needed to be set as 3 or a corresponding value.

Moreover, in the exemplary embodiments illustrated in FIG. 5 through FIG. 8, When writing the data segments and the parity code segments into the first physical programming unit, the memory management circuit 202 may write one or more first invalid bits altogether to fill up a portion of the first physical programming unit that is not filled with the data segments and the parity code segments. Similarly, when writing the data segments and the parity code segments into the second physical programming unit, the memory management circuit 202 may write one or more second invalid bits altogether to fill up a portion of the second physical programming unit that is not filled with the data segments and the parity code segments. The first and the second invalid bits may be any invalid data.

Figure 9:
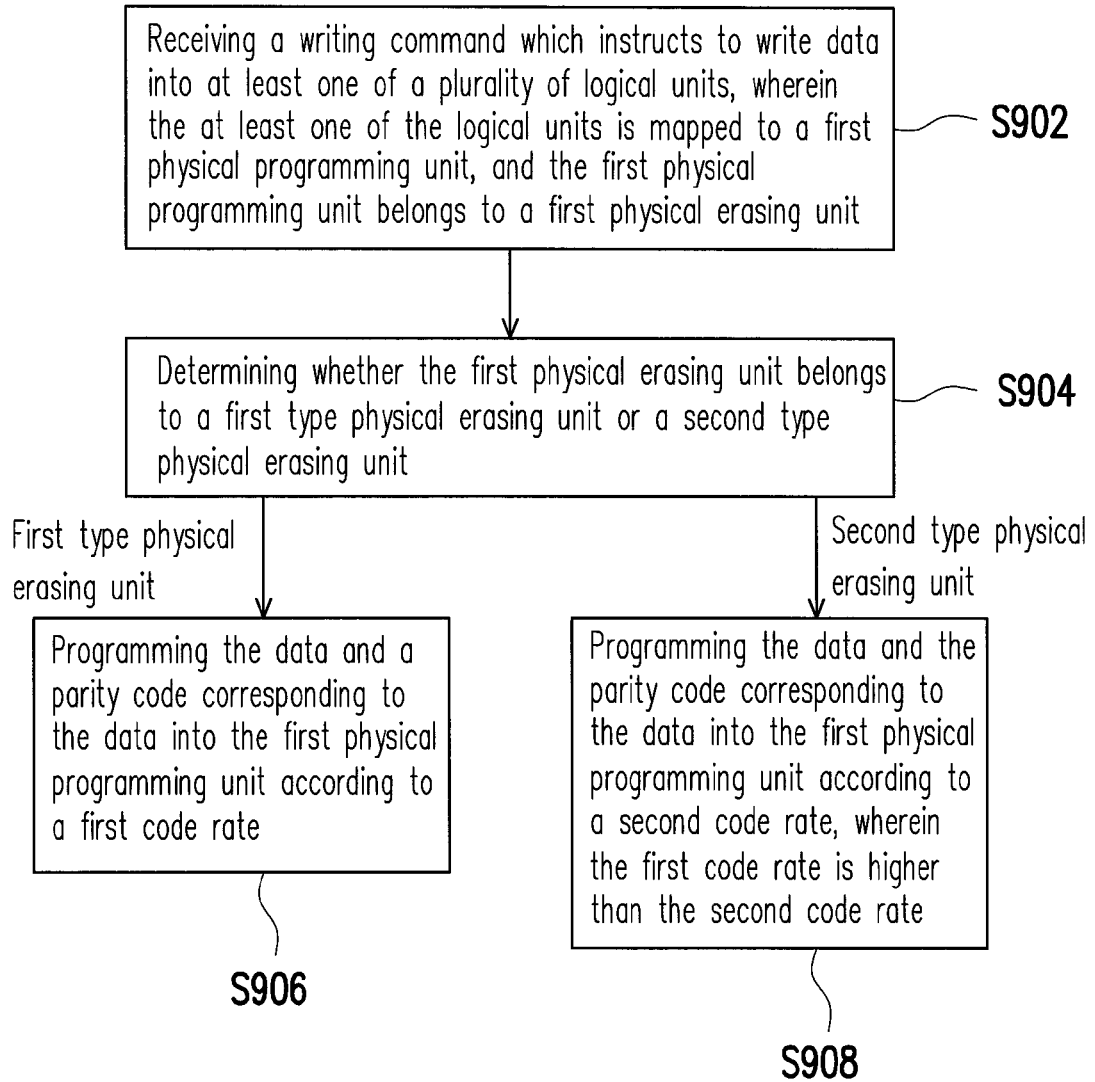
FIG. 9 is a flowchart of a method for programming data according to an exemplary embodiment of the present invention.

FIG. 9 is a flowchart of a method for programming data according to an exemplary embodiment of the present invention.

With reference to FIG. 9, in step S902, a writing command is received. The writing command instructs to write data into at least one of a plurality of logical units, where the at least one of the logical units is mapped to a first physical programming unit, and the first physical programming unit belongs to a first physical erasing unit.

In step S904, whether the first physical erasing unit belongs to a first type physical erasing unit or a second type physical erasing unit is determined.

If the first physical erasing unit belongs to the first type physical erasing unit, in step S906, the data and a parity code corresponding to the data are programmed to the first physical programming unit according to a first code rate.

If the first physical erasing unit belongs to the second type physical erasing unit, in step S908, the data and a parity code corresponding to the data are programmed to the first physical programming unit according to a second code rate. The first code rate is higher than the second code rate.

Figure 10:
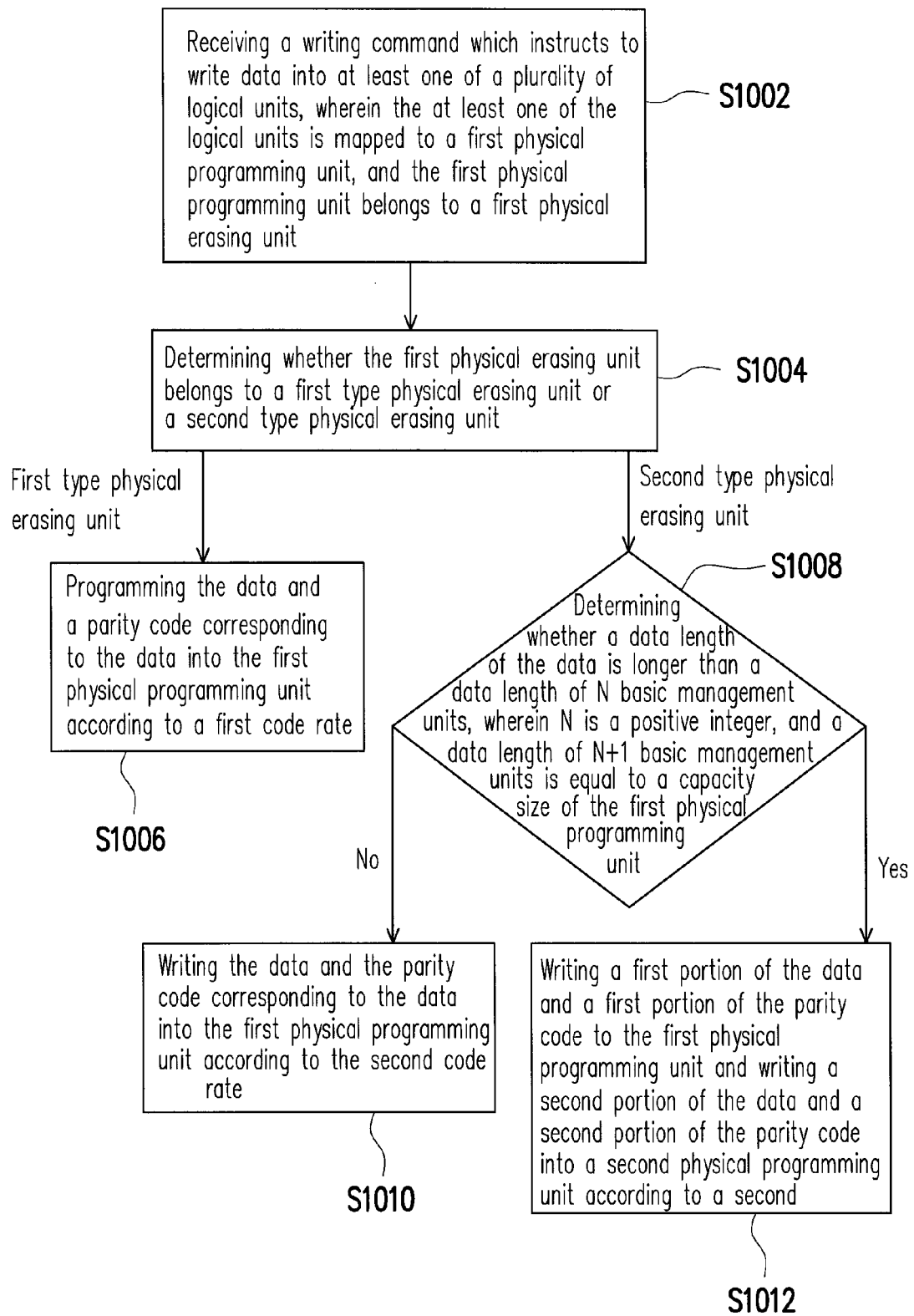
FIG. 10 is a flowchart of a method for programming data according to another exemplary embodiment of the present invention.

FIG. 10 is a flowchart of a method for programming data according to another exemplary embodiment of the present invention.

With reference to FIG. 10, in step S1002, a writing command is received. The writing command instructs to write data into at least one of a plurality of logical units, where the at least one of the logical units is mapped to a first physical programming unit, and the first physical programming unit belongs to a first physical erasing unit.

In step S1004, whether the first physical erasing unit belongs to a first type physical erasing unit or a second type physical erasing unit is determined.

If the first physical erasing unit belongs to the first type physical erasing unit, in step S1006, the data and a parity code corresponding to the data are written into the first physical programming unit according to a first code rate.

If the first physical erasing unit belongs to the second type physical erasing unit, In step S1008, whether a data length of the data is over a data length of N basic management units is determined, where N is positive integer, and a data length of N+1 basic management units is equal to a capacity size of the first physical programming unit.

If the data length of the data is not over the data length of N basic management units, in step S1010, the data and the parity code corresponding to the data are written only into the first physical programming unit according to a second code rate.

If the data length of the data is over the data length of N basic management units, in step S1012, a first portion of the data and a first portion of the parity code are written into the first physical programming unit according to the second code rate, and a second portion of the data and a second portion of the parity code are written into a second physical programming unit.

Nevertheless, each step of FIG. 9 and FIG. 10 has been described as above and will not repeated hereinafter. It is should be noted that each step illustrated in FIG. 9 and FIG. 10 may be implemented as a plurality of program codes or circuits, but construes no limitations to the present invention. The methods illustrated in FIG. 9 and FIG. 10 may be implemented together with the exemplary embodiments above or may be performed solely, and the present invention is not limited thereto. Specially, in the present exemplary embodiment, The memory management circuit 202 may perform various operations, such as data and/or parity code writing or reading, on the rewritable non-volatile memory module 106 through, for example, sending at least one command sequence to the rewritable non-volatile memory module 106, where each command sequence includes at least one command. The rewritable non-volatile memory module 106 may then perform operations corresponding to the received command sequences.

Additionally, in another exemplary embodiment, the aforementioned determination steps may also be applied to physical programming unit or physical sectors. For example, according to the means described in each exemplary embodiment above, whether a first physical programming unit belongs to a first type physical programming unit or a second type physical programming unit may be determined, and the data and the parity code corresponding to the data may be programmed to the first physical programming unit according to the first code rate or the second code rate. Specially, different physical programming units or physical sectors in the same physical erasing unit may also have different BERs, and thus, such means may be more suitable for the actual usage of the memories.

To conclude, in the method for programming data, the memory storage device and the memory control circuit unit provided by the present invention, according to whether a physical erasing unit in the rewritable non-volatile memory module is the first type physical erasing unit or the second type physical erasing unit, the data and the parity code corresponding to the data can be adaptively written into the first physical erasing unit according to the first code rate or the second code rate which is higher than the first code rate. In this way, even though the BER of a physical erasing unit is over the predetermined permissible range, the physical erasing unit can continue to be used, rather than be discarded directly.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for programming data, for controlling a rewritable non-volatile memory module, wherein the rewritable non-volatile memory module comprises a plurality of physical erasing units, and each of the physical erasing units comprises a plurality of physical programming units, the method comprising:

determining a bit error rate (BER) assessing value of a first physical erasing unit among the physical erasing units according to at least one of erasing count information, writing count information, reading count information, data storage time information and temperature information of the first physical erasing unit;

receiving a writing command which instructs to write data into at least one of a plurality of logical units, wherein the at least one of the logical units is mapped to a first physical programming unit among the physical programming units, and the first physical programming unit belongs to the first physical erasing unit;

determining whether the first physical erasing unit belongs to a first type physical erasing unit or a second type physical erasing unit according to the determined BER assessing value;

if the first physical erasing unit belongs to the first type physical erasing unit, programming the data and a parity code corresponding to the data into the first physical programming unit according to a first code rate; and if the first physical erasing unit belongs to the second type physical erasing unit, programming the data and the parity code corresponding to the data into the first physical programming unit according to a second code rate, wherein the first code rate is higher than the second code rate, the step of programming the data and the parity code according to the second code rate comprises:

determining whether a data length of the data is over a data length of N basic management units, wherein N is a positive integer, and a data length of N+1 basic management units is equal to a capacity size of the first physical programming unit;

if the data length of the data is not over the data length of the N basic management units, programming the data and the parity code corresponding to the data into the first physical programming unit according to the second code rate; and if the data length of the data is over the data length of the N basic management units, programming a first portion of the data and a first portion of the parity code into the first physical programming unit and programming a second portion of the data and a second portion of the parity code into a second physical programming unit among the physical programming units according to the second code rate.

2. The method according to claim 1, wherein the step of determining whether the first physical erasing unit belongs to the first type physical erasing unit or the second type physical erasing unit comprises:

determining whether the BER assessing value of the first physical erasing unit meets a threshold condition;

if the BER assessing value of the first physical erasing unit does not meet the threshold condition, determining that the first physical erasing unit belongs to the first type physical erasing unit; and if the BER assessing value of the first physical erasing unit meets the threshold condition, determining that the first physical erasing unit belongs to the second type physical erasing unit.

3. The method according to claim 2, wherein the step of determining the BER assessing value of the first physical erasing unit comprises:

determining the BER assessing value of the first physical erasing unit according to at least one of error bits number information and BER information of the first physical erasing unit.

4. The method according to claim 1, wherein the step of programming the data and the parity code corresponding to the data into the first physical programming unit according to the first code rate comprises:

dividing the data into at least one first data segment and generating at least one first parity code segment, wherein each of the at least one first parity code segment corresponds to one of the at least one first data segment, wherein the step of programming the data and the parity code corresponding to the data into the first physical programming unit according to the second code rate comprises:

dividing the data into at least one second data segment and generating at least one second parity code segment, wherein each of the at least one second parity code segment corresponds to one of the at least one second data segment, wherein a data length of each of the at least one first data segment is equal to a data length of each of the at least one second data segment, and a data length of each of the at least one first parity code segment is shorter than a data length of each of the at least one second parity code segment.

5. The method according to claim 1, wherein the step of programming the data and the parity code corresponding to the data into the first physical programming unit according to the first code rate comprises:

dividing the data into at least one first data segment and generating at least one first parity code segment, wherein each of the at least one first parity code segment corresponds to one of the at least one first data segment, wherein the step of programming the data and the parity code corresponding to the data into the first physical programming unit according to the second code rate comprises:

dividing the data into at least one second data segment and generating at least one second parity code segment, wherein each of the at least one second parity code segment corresponds to one of the at least one second data segment, wherein a data length of each of the at least one first data segment is longer than a data length of each of the at least one second data segment, and a data length of each of the at least one first parity code segment is equal to a data length of each of the at least one second parity code segment.

6. The method according to claim 1, wherein the second physical programming unit belongs to the first physical erasing unit or a second physical erasing unit among the physical erasing units which also belongs to the second type physical erasing unit.

7. The method according to claim 1, wherein a data length of the first portion of the data is consistent with the data length of the N basic management units, and the method further comprises:

programming at least one first invalid bit into the first physical programming unit to fill up a part therein that is not filled with the first portion of the data and the first portion of the parity code; and programming at least one second invalid bit into the second physical programming unit to fill up the part that is not filled with the second portion of the data and the second portion of the parity code.

8. A memory storage device, comprising:

a connection interface unit, configured to be coupled to a host system;

a rewritable non-volatile memory module, comprising a plurality of physical erasing units, wherein each of the physical erasing units comprises a plurality of physical programming units; and a memory control circuit unit, coupled with the connection interface unit and the rewritable non-volatile memory module, wherein the memory control circuit unit is configured to determine a bit error rate (BER) assessing value of a first physical erasing unit among the physical erasing units according to at least one of erasing count information, writing count information, reading count information, data storage time information and temperature info nation of the first physical erasing unit, the memory control circuit unit is further configured to receive a writing command which instructs to write data into at least one of a plurality of logical units, the at least one of the logical units is mapped to a first physical programming unit among the physical programming units, and the first physical programming unit belongs to the first physical erasing unit, the memory control circuit unit is further configured to determine whether the first physical erasing unit belongs to a first type physical erasing unit or a second type physical erasing unit according to the determined BER assessing value, if the first physical erasing unit belongs to the first type physical erasing unit, the memory control circuit unit is further configured to program the data and the parity code corresponding to the data into the first physical programming unit according to a first code rate, and if the first physical erasing unit belongs to the second type physical erasing unit, the memory control circuit unit is further configured to program the data and the parity code corresponding to the data into the first physical programming unit according to a second code rate, wherein the first code rate is higher than the second code rate, wherein the operation of programming the data and the parity code according to the second code rate comprises:

determining whether a data length of the data is over a data length of N basic management units, wherein N is a positive integer, and a data length of N+1 basic management units is equal to a capacity size of the first physical programming unit;

if the data length of the data is not over the data length of the N basic management units, programming the data and the parity code corresponding to the data into the first physical programming unit according to the second code rate; and if the data length of the data is over the data length of the N basic management units, programming a first portion of the data and a first portion of the parity code into the first physical programming unit and programming a second portion of the data and a second portion of the parity code into a second physical programming unit among the physical programming units according to the second code rate.

9. The memory storage device according to claim 8, wherein the operation of the memory control circuit unit determining whether the first physical erasing unit belongs to the first type physical erasing unit or the second type physical erasing unit comprises:

determining whether the BER assessing value of the first physical erasing unit meets a threshold condition;

if the BER assessing value of the first physical erasing unit does not meet the threshold condition, determining that the first physical erasing unit belongs to the first type physical erasing unit; and if the BER assessing value of the first physical erasing unit meets the threshold condition, determining that the first physical erasing unit belongs to the second type physical erasing unit.

10. The memory storage device according to claim 9, wherein the memory control circuit unit is further configured to determine the BER assessing value of the first physical erasing unit according to at least one of error bit number information, and BER information of the first physical erasing unit.

11. The memory storage device according to claim 8, wherein the operation of the memory control circuit unit programming the data and the parity code corresponding to the data into the first physical programming unit according to the first code rate comprises:

dividing the data into at least one first data segment and generating at least one first parity code segment, wherein each of the at least one first parity code segment corresponds to one of the at least one first data segment, wherein the operation of the memory control circuit unit programming the data and the parity code corresponding to the data into the first physical programming unit according to the second code rate comprises:

dividing the data into at least one second data segment and generating at least one second parity code segment, wherein each of the at least one second parity code segment corresponds to one of the at least one second data segment, wherein a data length of each of the at least one first data segment is equal to a data length of each of the at least one second data segment, and a data length of each of the at least one first parity code segment is shorter than a data length of each of the at least one second parity code segment.

12. The memory storage device according to claim 8, wherein the operation of the memory control circuit unit programming the data and the parity code corresponding to the data into the first physical programming unit according to the first code rate comprises:

dividing the data into at least one first data segment and generating at least one first parity code segment, wherein each of the at least one first parity code segment corresponds to one of the at least one first data segment, wherein the operation of the memory control circuit unit programming the data and the parity code corresponding to the data into the first physical programming unit according to the second code rate comprises:

dividing the data into at least one second data segment and generating at least one second parity code segment, wherein each of the at least one second parity code segment corresponds to one of the at least one second data segment, wherein a data length of each of the at least one first data segment is longer than a data length of each of the at least one second data segment, and a data length of each of the at least one first parity code segment is equal to a data length of each of the at least one second parity code segment.

13. The memory storage device according to claim 8, wherein the second physical programming unit belongs to the first physical erasing unit or a second physical erasing unit among the physical erasing units which also belongs to the second type physical erasing unit.

14. The memory storage device according to claim 8, wherein a data length of the first portion of the data is consistent with the data length of the N basic management units, the memory control circuit unit is further configured to program at least one first invalid bit into the first physical programming unit to fill up a part therein that is not filled with the first portion of the data and the first portion of the parity code, and the memory control circuit unit is further configured to program at least one second invalid bit into the second physical programming unit to fill up a part therein that is not filled with the second portion of the data and the second portion of the parity code.

15. A memory control circuit unit, for controlling a rewritable non-volatile memory module, wherein the rewritable non-volatile memory module comprises a plurality of physical erasing units, and each of the physical erasing units comprises a plurality of physical programming units, the memory control circuit unit comprising:

a host interface, configured to be coupled to a host system;
a memory interface, configured to be coupled to the rewritable non-volatile memory module;
an error checking and correcting (ECC) circuit; and
a memory management circuit, coupled with the host interface, the memory interface and the ECC circuit, wherein
the memory management circuit is configured to determine a bit error rate (BER) assessing value of a first physical erasing unit among the physical erasing units according to at least one of erasing count information, writing count information, reading count information, data storage time information and temperature information of the first physical erasing unit,
the memory management circuit is further configured to receive a writing command which instructs to write data into at least one of a plurality of logical units, the at least one of the logical units is mapped to a first physical programming unit among the physical programming units, and the first physical programming unit belongs to the first physical erasing unit,
the memory management circuit is further configured to determine whether the first physical erasing unit belongs to a first type physical erasing unit or a second type physical erasing unit according to the determined BER assessing value,
if the first physical erasing unit belongs to the first type physical erasing unit, the memory management circuit is further configured to send a first command sequence which instructs to program the data and the parity code corresponding to the data into the first physical programming unit according to a first code rate,
if the first physical erasing unit belongs to the second type physical erasing unit, the memory management circuit is further configured to send a second command sequence which instructs to program the data and the parity code corresponding to the data into the first physical programming unit according to a second code rate, wherein the first code rate is higher than the second code rate,
wherein the operation of sending the second command sequence comprises:
determining whether a data length of the data is over a data length of N basic management units, wherein N is a positive integer, and a data length of N+1 basic management units is equal to a capacity size of the first physical programming unit,
if the data length of the data is not over the data length of the N basic management units, sending the second command sequence to instruct to program the data and the parity code corresponding to the data into the first physical programming unit only according to the second code rate, and
when the data length of the data is over the data length of the N basic management units, sending the second command sequence to instruct to program a first portion of the data and a first portion of the parity code into the first physical programming unit and to program a second portion of the data and a second portion of the parity code into a second physical programming unit among the physical programming units according to the second code rate.

16. The memory control circuit unit according to claim 15, wherein the operation of the memory management circuit determining whether the first physical erasing unit belongs to the first type physical erasing unit or the second type physical erasing unit comprises:

determining whether the BER assessing value of the first physical erasing unit meets a threshold condition;
if the BER assessing value of the first physical erasing unit does not meet the threshold condition, determining that the first physical erasing unit belongs to the first type physical erasing unit; and
if the BER assessing value of the first physical erasing unit meets a threshold condition, determining that the first physical erasing unit belongs to the second type physical erasing unit.

17. The memory control circuit unit according to claim 16, wherein the memory management circuit is further configured to determine the BER assessing value of the first physical erasing unit according to at least one error bit number information, and BER information of the first physical erasing unit.

18. The memory control circuit unit according to claim 15, wherein the operation of the memory management circuit sending the first command sequence comprises:

dividing the data into at least one first data segment and controlling the ECC circuit to generate at least one first parity code segment, wherein each of the at least one first parity code segment corresponds to one of the at least one first data segment,
wherein the operation of the memory management circuit sending the second command sequence comprises:
dividing the data into at least one second data segment and controlling the ECC circuit to generate at least one second parity code segment, wherein each of the at least one second parity code segment corresponds to one of the at least one second data segment,
wherein a data length of each of the at least one first data segment is equal to a data length of each of the at least one second data segment, and a data length of each of the at least one first parity code segment is shorter than a data length of each of the at least one second parity code segment.

19. The memory control circuit unit according to claim 15, wherein the operation of the memory management circuit sending the first command sequence comprises:

dividing the data into at least one first data segment and controlling the ECC circuit to generate at least one first parity code segment, wherein each of the at least one first parity code segment corresponds to one of the at least one first data segment,
wherein the operation of the memory management circuit sending the second command sequence comprises:
dividing the data into at least one second data segment and controlling the ECC circuit to generate at least one second parity code segment, wherein each of the at least one second parity code segment corresponds to one of the at least one second data segment,
wherein a data length of each of the at least one first data segment is longer than a data length of each of the at least one second data segment, and a data length of each of the at least one first parity code segment is equal to a data length of each of the at least one second parity code segment.

20. The memory control circuit unit according to claim 15, wherein the second physical programming unit belongs to the first physical erasing unit or a second type physical erasing unit among the physical erasing units which also belongs second type physical erasing unit.

21. The memory control circuit unit according to claim 15, wherein a data length of the first portion of the data is consistent with the data length of the N basic management units, and the second command sequence further instructs to program at least one first invalid bit into the first physical programming unit to fill up a part therein that is not filled with the first portion of the data and the first portion of the parity code and to program at least one second invalid bit into the second physical programming unit to fill up a part therein that is not filled with the second portion of the data and the second portion of the parity code.

* * * * *